United States Patent Office 3,608,153
Patented Sept. 28, 1971

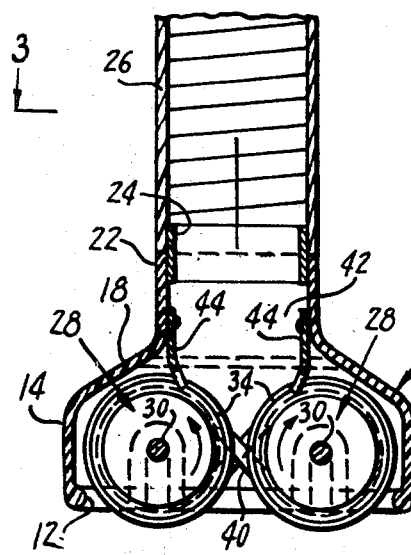
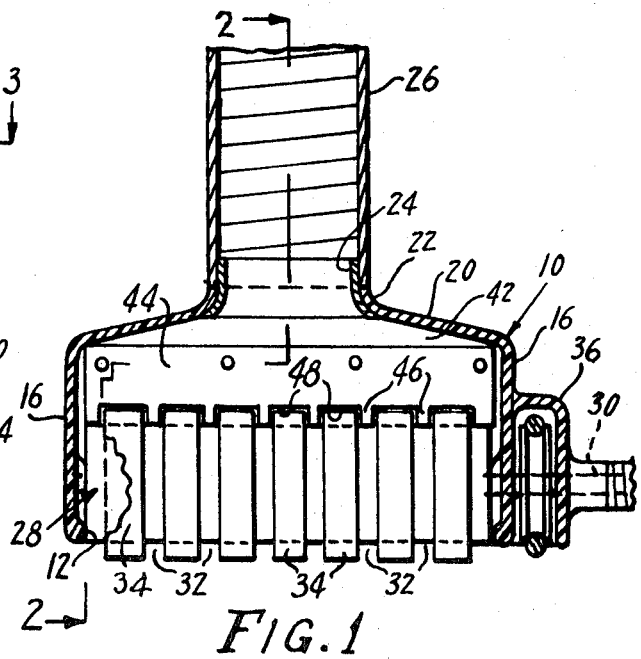
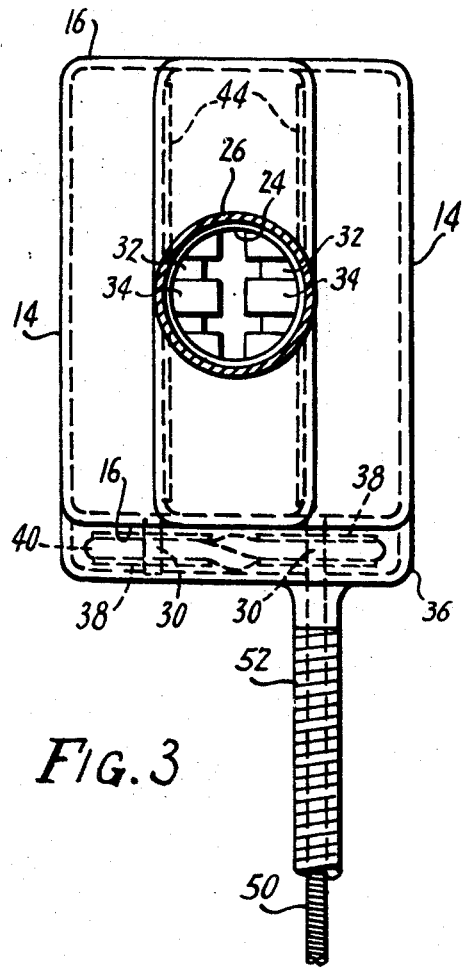
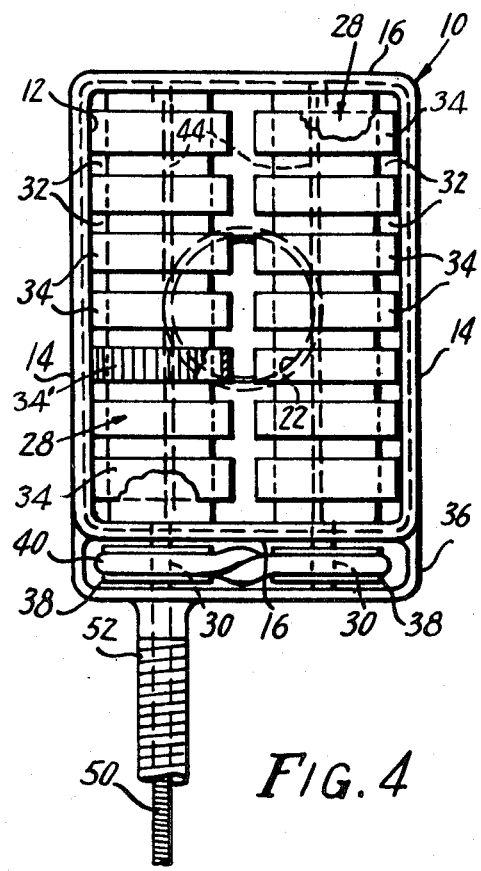

3,608,153
DEVICE FOR REMOVING WOOL FROM SHEEP
Dale L. Berrett, Calistoga, Calif.
(Rte. 1, Arrington, Tenn. 37014)
Filed May 21, 1969, Ser. No. 826,396
Int. Cl. C14b *19/00*
U.S. Cl. 19—2      1 Claim

ABSTRACT OF THE DISCLOSURE

Oppositely rotating grooved rollers pull from the sheep, wool which has been rendered loose or brittle, for example, by the administration to the sheep of certain chemicals now in use, and the rollers supply the wool to a flexible pipe leading to a source of vacuum for collecting the wool.

BACKGROUND OF THE INVENTION

As is well-known, it has always been the common practice to remove wool from sheep by conventional shearing means. There are now in use chemicals fed to sheep which do not harm the animal but which, in a predetermined length of time, will cause the hair follicles to become narrower or brittle just above the skin so that the wool may be snatched or pulled from the sheep painlessly and without harm to the animal.

SUMMARY OF THE INVENTION

A casing having an open bottom is provided with two adjacent, but not contacting, annularly grooved rollers oppositely driven so that the bottoms of the rollers rotate inwardly and toward each other. The top of the casing forms a chamber co-extensive with the lengths and widths of the rollers and a hose or other flexible pipe communicates between said chamber and a wool collecting mechanism including a source of vacuum for pulling the wool from the chamber as it is supplied thereto by the rollers. At their ends, the rollers carry a pair of pulleys connected by a crossed belt so that the rollers will be driven in opposite directions as stated, and a power source is connected to the shaft of one of the pulleys and rollers to drive the mechanism.

The rollers are annularly grooved at spaced points therealong to assist in providing friction to grip the wool. A pair of plates are carried by the device and project into the chamber referred to, and these plates are provided with fingers extending into the grooves of the rollers while the remainders of the plates are in proximity to the flanges between the grooves. The plates scrape or brush from the rollers any wool tending to adhere thereto so that all of the wool is fed into the chamber to be picked up by the vacuum means referred to so as to be properly collected.

BRIEF DESCRIPTION OF THE DRAWING

FIG. 1 is a vertical sectional view through the casing between and longitudinally of the rollers;
FIG. 2 is a section on line 2—2 of FIG. 1;
FIG. 3 is a section on line 3—3 of FIG. 2; and
FIG. 4 is a bottom plan view of the device.

DESCRIPTION OF THE PREFERRED EMBODIMENT

The device comprises a casing indicated as a whole by the numeral 10 having an open bottom 12, the casing being of elongated rectangular shape in plan as shown in FIG. 4. The casing is provided with side walls 14 and end walls 16 as shown in FIGS. 1 and 2. The upper extremities of the walls 14 converge as at 18 while the walls 16 similarly converge as at 20 to terminate in a circular neck 22 carrying an internal annular flange 24 having a friction fit with a flexible rubber or similar hose 26 for a purpose to be described.

Within the casing is arranged a pair of rollers each indicated as a whole by the numeral 28 having their axes parallel and supported on shafts 30 journaled in the end walls 16. Each of the rollers 28 is annularly grooved as at 32 providing therebetween annular flanges 34, which flanges are spaced from each other between the rollers as shown in FIG. 2. The rollers project slightly below the open bottom 12 of the casing 10 as shown in FIGS. 1 and 2.

If desired, the rollers 28 may be provided with sleeves or coverings around the flanges 34 thereof, and one of these has been shown in FIG. 4 and indicated by the numeral 34'. Such sleeves may have suitable ridges or slots cut or formed in the surfaces thereof to better facilitate the grasping of the wool. These sleeves may be changed or replaced if and when they show wear. The sleeves can be made of hard rubber or any other suitable material. Instead of the sleeves, if desired, the flanges 34 may be ribbed or grooved.

Preferably formed integral with the casing 10 is an auxiliary open-bottomed casing 36 (FIGS. 1 and 4) and within such auxiliary casing each of the shafts 30 is provided with a pulley 38 around which passes a belt 40. This belt is crossed between the pulleys 38 as shown in FIG. 2 so that the rollers 28 will be driven in opposite directions. These rollers rotate in the direction of the arrows in FIG. 2, the bottoms of the rollers rotating inwardly and upwardly toward each other.

Above the rollers 28 the casing 10 forms a chamber 42 in opposite sides of which are arranged plates 44, the lower ends of which extend downwardly and slightly inwardly to terminate in fingers 46 extending into the respective grooves 32. Between these fingers the plate 44 is recessed as at 48 adjacent the periphery of the flanges 34.

Any suitable means may be employed for driving the rollers. As shown in FIGS. 1, 3 and 4, one of the shafts 30 projects beyond the auxiliary housing 36 and is connected to a flexible shaft 50 extending through a flexible housing 52.

OPERATION

Various trade publications have carried articles pertaining to the use of certain chemicals in feeding sheep which causes the hair follicles to become narrower and/or brittle just above the skin of the animal. After a predetermined length of time, the wool may be pulled or snatched from the sheep without pain or harm to the animal. The present device is intended for use with sheep which have been treated with such chemicals. The device is moved over the body of the sheep and the thick wool will be engaged by the rollers 28 and the wool pulled from the sheep. The wool being thick, the rollers 28 should be somewhat spaced from each other as shown in FIG. 2. This will still provide a gripping action of the wool between the rollers, and the edges of the flanges 34 increase the frictional grip of the rollers on the wool to effectively pull it from the animal.

From the rollers the wool passes upwardly into the chamber 42. Any wool tending to adhere to the rollers will be scraped or brushed therefrom by the plates 44, the lower edges of which follow the profiles of the rollers as shown in FIG. 1. All of the wool thus passes into the chamber 42 and thence upwardly through the flexible hose 26, connected as stated, to a source of vacuum. The wool may be collected against a screen or other suitable structure which forms per se no part of the present invention. The removal of wool from chemically fed sheep may be carried out much more quickly and efficiently than can be done with the conventional shearing means now employed.

From the foregoing it will now be seen that there is herein provided an improved device for removing wool from sheep which accomplishes all of the objects of this invention and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative, and not in a limiting sense.

I claim:

1. A device for removing wool from sheep comprising an open-bottomed casing, a pair of rollers therein arranged with their axes parallel and rotating in opposite directions so that the bottoms of the rollers move inwardly and upwardly toward each other to pull wool from a sheep, said casing above said rollers forming a chamber, means for removing from said chamber wool supplied thereto by said rollers, the bottoms of said rollers projecting somewhat below the open bottom of said casing, means for driving said rollers to rotate them in opposite directions said rollers annularly grooved at spaced points therealong to form flanges between said grooves, and means carried by said casing for scraping wool from said rollers as the wool passes upwardly toward said chamber, said means for scraping wool from said rollers comprising a pair of opposite arranged plates carried by said casing in said chamber, said plates having lower edges shaped to fit the profile of the respective rollers, and being provided with fingers projecting into the grooves of said rollers and having recesses arranged in close proximity to said flanges.

References Cited

UNITED STATES PATENTS

| | | | |
|---|---|---|---|
| 212,555 | 2/1879 | House | 69—20 |
| 400,894 | 4/1889 | Brierley | 69—26 |
| 1,284,203 | 11/1918 | Rieske | 19—2 |
| 2,439,334 | 4/1948 | Bloom | 17—11.1R |
| 2,516,374 | 7/1950 | Eisen | 69—26X |
| 2,788,651 | 4/1957 | Qwarnstrom | 69—26X |

FOREIGN PATENTS

| | | | |
|---|---|---|---|
| 383,797 | 10/1923 | Germany | 69—26 |

DORSEY NEWTON, Primary Examiner

U.S. Cl. X.R.

69—20